United States Patent
Tomita et al.

(10) Patent No.: US 12,454,584 B2
(45) Date of Patent: Oct. 28, 2025

(54) METHOD OF PRODUCING RESIN PARTICLES AND METHOD OF PRODUCING ELECTROSTATIC CHARGE IMAGE DEVELOPING TONER

(71) Applicant: FUJIFILM Business Innovation Corp., Tokyo (JP)

(72) Inventors: Daisuke Tomita, Kanagawa (JP); Tsutomu Furuta, Kanagawa (JP); Daisuke Ishizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 924 days.

(21) Appl. No.: 17/577,344

(22) Filed: Jan. 17, 2022

(65) Prior Publication Data

US 2023/0098401 A1 Mar. 30, 2023

(30) Foreign Application Priority Data

Sep. 28, 2021 (JP) .................................. 2021-157559

(51) Int. Cl.
| | |
|---|---|
| *C08F 2/26* | (2006.01) |
| *C08F 212/08* | (2006.01) |
| *C08F 220/18* | (2006.01) |
| *G03G 9/08* | (2006.01) |
| *G03G 9/087* | (2006.01) |
| *G03G 9/09* | (2006.01) |
| *G03G 9/097* | (2006.01) |

(52) U.S. Cl.
CPC .............. *C08F 2/26* (2013.01); *C08F 212/08* (2013.01); *C08F 220/1804* (2020.02); *G03G 9/0806* (2013.01); *G03G 9/0819* (2013.01); *G03G 9/08711* (2013.01); *G03G 9/08755* (2013.01); *G03G 9/08782* (2013.01); *G03G 9/09* (2013.01); *G03G 9/09725* (2013.01)

(58) Field of Classification Search
CPC .... C08F 2/26; C08F 220/1804; C08F 212/08; G03G 9/0806; G03G 9/0819; G03G 9/08711; G03G 9/08755; G03G 9/08782; G03G 9/09; G03G 9/09725
See application file for complete search history.

(56) References Cited

U.S. PATENT DOCUMENTS

| | | | |
|---|---|---|---|
| 9,663,650 B2 | 5/2017 | Jhaveri | |
| 9,701,829 B2 | 7/2017 | Jhaveri et al. | |
| 10,106,679 B2 | 10/2018 | Jhaveri et al. | |
| 2011/0112218 A1 | 5/2011 | Weitzel et al. | |
| 2022/0299895 A1* | 9/2022 | Noguchi | G03G 9/0804 |
| 2022/0299898 A1* | 9/2022 | Sasaki | G03G 9/0815 |

FOREIGN PATENT DOCUMENTS

| | | |
|---|---|---|
| JP | H11171903 | 6/1999 |
| JP | 2008088330 | 4/2008 |
| JP | 2010024309 | 2/2010 |
| JP | 2010024309 A * | 2/2010 |
| JP | 2010107896 | 5/2010 |
| JP | 2010537022 | 12/2010 |
| JP | 2014525503 | 9/2014 |

OTHER PUBLICATIONS

English machine translation of the description of JP-2010024309-A (Year: 2010).*
"Office Action of Japan Counterpart Application", issued on May 27, 2025, with English translation thereof, pp. 1-11.

* cited by examiner

*Primary Examiner* — Mark F. Huff
*Assistant Examiner* — Boone Alexander Evans
(74) *Attorney, Agent, or Firm* — JCIPRNET

(57) ABSTRACT

A method of producing resin particles includes a first step of adding a monomer-containing emulsified liquid that contains a polymerizable monomer and an aqueous medium to an aqueous mother medium to polymerize the polymerizable monomer; and a second step of adding an aqueous medium for cooling to the aqueous mother medium after completion of the addition of the monomer-containing emulsified liquid to the aqueous mother medium.

14 Claims, No Drawings

METHOD OF PRODUCING RESIN PARTICLES AND METHOD OF PRODUCING ELECTROSTATIC CHARGE IMAGE DEVELOPING TONER

CROSS-REFERENCE TO RELATED APPLICATIONS

This application is based on and claims priority under 35 USC 119 from Japanese Patent Application No. 2021-157559 filed Sep. 28, 2021.

BACKGROUND

(i) Technical Field

The present invention relates to a method of producing resin particles and a method of producing an electrostatic charge image developing toner.

(ii) Related Art

JP2010-024309A suggests "a method of producing an aqueous emulsion polymer, including: charging a reaction kettle with an initial preparation liquid containing at least one selected from water, a monomer, or an emulsifier using a reaction kettle provided with a jacket portion in the outer periphery, a supply pump for sending cooling water to the jacket portion, and a supply pipe provided with a control valve that sends the cooling water from the supply pump to the jacket portion and controls the supply amount of the cooling water, heating the initial preparation liquid to an initial rise temperature and adding an initial catalyst-containing liquid as necessary, and continuously dripping a monomer-containing dripping liquid containing a monomer for dripping and a catalyst dripping liquid containing a catalyst for dripping to the reaction kettle and performing emulsion polymerization of the monomer while adjusting the temperature inside the reaction kettle to be close to a predetermined polymerization temperature, in which in a case where the predetermined polymerization temperature is defined as Tp (° C.), the temperature of the monomer-containing dripping liquid is defined as Ta (° C.), the initial rise temperature is defined as Tb (° C.), the temperature of the initial catalyst-containing liquid is defined as Tc (° C.), and the temperature of the catalyst dripping liquid is defined as Td (° C.), a reaction system heat removal amount (Q/T) per 1° C. to be heat-removed from the reaction system for constantly maintaining the polymerization temperature is acquired according to Equation (6) using a heat amount (Qm) of the monomer represented by Equation (1), a heat removal amount (Qa) due to the monomer-containing dripping liquid represented by Equation (2), a heat removal amount (Qb) due to the initial preparation liquid after the initial temperature rise represented by Equation (3), a heat removal amount (Qc) due to the initial catalyst-containing liquid represented by Equation (4), and a heat removal amount (Qd) due to the catalyst dripping liquid represented by Equation (5), based on the polymerization temperature (Tp), $$Qm(\text{kcal}) = \Sigma(Mn \times qn) \quad (1)$$

$$Qa(\text{kcal}) = R1 \times (Tp - Ta) \quad (2)$$

$$Qb(\text{kcal}) = R2 \times (Tp - Tb) \quad (3)$$

$$Qc(\text{kcal}) = R3 \times (Tp - Tc) \quad (4)$$

$$Qd(\text{kcal}) = R4 \times (Tp - Td) \quad (5)$$

$$Q/T(\text{kcal}/° \text{C.}) = (Qm - Qa - Qb - Qc - Qd)/(Tp - Ta) \quad (6)$$

(n represents an integer, Mn represents the amount (kg) of the n-th monomer to be used, qn represents polymerization heat (kcal/kg) of the n-th monomer, R1 represents a liquid amount (kg) of the monomer-containing dripping liquid, R2 represents a liquid amount (kg) of the initial preparation liquid, R3 represents a liquid amount (kg) of the initial catalyst-containing liquid, and R4 represents a liquid amount (kg) of the catalyst dripping liquid)

a supply amount (W) of the cooling water per predetermined time is acquired according to Equation (7), $$W(\text{liter/min}) = X \times (Q/T)1/2/Rt \quad (7)$$

(Rt represents the reaction time (min), X represents the coefficient)

in a case where the opening time of the control valve is defined as S1 (sec) and the closing time of the control valve is defined as S2 (sec), the emulsion polymerization temperature is maintained at a temperature within a range of the polymerization temperature Tp±5% by setting the valve opening OP (%) during the opening of the control valve to the value obtained by Equation (8), $$OP(\%) = (W/P) \times (S1/(S1+S2)) \times 100 \quad (8)$$

(P represents the maximum supply amount (L/min) of the pump, where "S1>0" and "S2>0" are satisfied)."

JP2010-537022A suggests "a method of producing a polymer stabilized with a protective colloid by emulsion polymerization in a reactor having an external cooling circulation path provided with a pump and a heat exchanger, in which a reaction mixture present in the reactor is transported by a pump into a cooled static mixer-heat exchanger having a fixed internal structure and is subsequently returned to the reactor.

SUMMARY

Aspects of non-limiting embodiments of the present disclosure relate to a method of producing resin particles and a method of producing an electrostatic charge image developing toner that include adding a monomer-containing emulsified liquid containing polymerizable monomers and an aqueous medium to an aqueous mother medium to polymerize the polymerizable monomers, in which generation of coarse powder is suppressed as compared to a case where an aqueous medium for cooling is not added to the aqueous mother medium after completion of the addition of the monomer-containing emulsified liquid to the aqueous mother medium or a case where the polymerizable monomers are a styrene-based monomer and a (meth)acrylic acid-based monomer, the content of the (meth)acrylic acid-based monomer is 20% by mass or greater and 60% by mass or less with respect to the styrene-based monomer, and the temperature of the aqueous mother medium after the addition of the monomer-containing emulsified liquid is maintained at a temperature out of the range of a set temperature ±1.5° C.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The above problem is solved by the following means. That is, according to an aspect of the present disclosure, there is provided a method of producing resin particles, including: adding a monomer-containing emulsified liquid that contains a polymerizable monomer and an aqueous medium to an aqueous mother medium to polymerize the polymerizable monomer; and adding an aqueous medium for cooling to the aqueous mother medium after completion of the addition of the monomer-containing emulsified liquid to the aqueous mother medium.

DETAILED DESCRIPTION

Hereinafter, exemplary embodiments that are examples of the present invention will be described. The following descriptions and examples merely illustrate the exemplary embodiments, and do not limit the scope of the exemplary embodiments.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

In the present specification, the term (meth)acrylic indicates both acryl and methacryl.

Each component may include a plurality of kinds of substances corresponding to each component.

In a case where a plurality of kinds of substances corresponding to each component in a composition are present, the amount of each component in the composition indicates the total amount of the plurality of kinds of substances present in the composition unless otherwise specified.

Method of Producing Resin Particles

A method of producing resin particles according to a first exemplary embodiment is a method including a first step of adding a monomer-containing emulsified liquid that contains a polymerizable monomer and an aqueous medium to an aqueous mother medium to polymerize the polymerizable monomer; and a second step of adding an aqueous medium for cooling to the aqueous mother medium after completion of the addition of the monomer-containing emulsified liquid to the aqueous mother medium.

The method of producing resin particles according to the first exemplary embodiment is a method of producing resin particles that suppresses generation of coarse powder, with the above-described configuration. The reason for this is assumed as follows.

In the method of producing resin particles, including a step of adding a monomer-containing emulsified liquid that contains a polymerizable monomer and an aqueous medium to an aqueous mother medium to polymerize the polymerizable monomer, for example, it is preferable that the temperature variation of the reaction solution (the solution containing the aqueous mother medium and the monomer-containing emulsified liquid) is reduced in order to suppress the generation of coarse powder. In the method of producing resin particles as described above, the temperature variation is reduced by controlling the temperature of the reaction solution using a reaction container having a temperature control function or controlling the temperature of the reaction solution by adding a monomer-containing emulsified liquid having a temperature lower than the temperature of the reaction solution.

However, even after completion of the addition of the monomer-containing emulsified liquid, the polymerization of the monomer may proceed. In a case where the polymerization of the monomer proceeds, since reaction heat is generated, the temperature of the reaction solution tends to increase, and the temperature variation of the reaction solution tends to be large. Therefore, the generation of coarse powder may not be sufficiently suppressed.

The method of producing resin particles according to the first exemplary embodiment includes a second step of adding an aqueous medium for cooling to the aqueous mother medium after completion of the addition of the monomer-containing emulsified liquid to the aqueous mother medium in addition to the first step of adding the monomer-containing emulsified liquid that contains the polymerizable monomer and the aqueous medium to the aqueous mother medium to polymerize the polymerizable monomer.

Since the method includes the second step, even in a case where the polymerization of the monomer proceeds after completion of the addition of the monomer-containing emulsified liquid, the temperature variation of the reaction solution can be suppressed by adding the aqueous medium for cooling. Therefore, the generation of coarse powder is likely to be suppressed.

As described above, the method of producing resin particles according to the first exemplary embodiment is assumed to be a method of producing resin particles that suppresses the generation of coarse powder.

The method of producing resin particles according to the second exemplary embodiment includes a step of adding a monomer-containing emulsified liquid that contains polymerizable monomers and an aqueous medium to the aqueous mother medium to polymerize the polymerizable monomers.

Further, the polymerizable monomers are a styrene-based monomer and a (meth)acrylic acid-based monomer, and the content of the (meth)acrylic acid-based monomer is 20% by mass or greater and 60% by mass or less with respect to the styrene-based monomer.

Further, the temperature of the aqueous mother medium after the addition of the monomer-containing emulsified liquid is maintained within a range of the set temperature ±1.5° C.

The method of producing resin particles according to the second exemplary embodiment is a method of producing resin particles that suppresses the generation of coarse powder with the above-described configuration. The reason for this is assumed as follows.

In the method of producing resin particles, including a step of adding a monomer-containing emulsified liquid that contains polymerizable monomers and an aqueous medium to an aqueous mother medium to polymerize the polymerizable monomers, the polymerization of the monomer is likely to proceed even after completion of the addition of the monomer-containing emulsified liquid in a case where the polymerizable monomers are a styrene-based monomer and a (meth)acrylic acid-based monomer, and the content of the (meth)acrylic acid-based monomer is 20% by mass or greater and 60% by mass or less with respect to the styrene-based monomer. Therefore, since reaction heat is generated, the temperature of the reaction solution tends to increase, and the temperature variation of the reaction solution tends to be large. Therefore, the generation of coarse powder may not be sufficiently suppressed.

On the other hand, in the method of producing resin particles according to the second exemplary embodiment includes a step of adding a monomer-containing emulsified liquid that contains polymerizable monomers and an aqueous medium to an aqueous mother medium to polymerize the polymerizable monomers, the temperature of the aqueous mother medium after the addition of the monomer-containing emulsified liquid is maintained within a range of the set temperature ±1.5° C. in a case where the polymerizable monomers are a styrene-based monomer and a (meth) acrylic acid-based monomer, and the content of the (meth) acrylic acid-based monomer is 20% by mass or greater and 60% by mass or less with respect to the styrene-based monomer.

By maintaining the temperature of the aqueous mother medium after the addition of the monomer-containing emulsified liquid at a temperature within the above-described numerical range, the temperature variation of reaction solution is suppressed even in a case where the polymerization of the monomers after the completion of the addition of the monomer-containing emulsified liquid has proceeded. Therefore, the generation of coarse powder is likely to be suppressed.

As described above, the method of producing resin particles according to the second exemplary embodiment is assumed to be a method of producing resin particles that suppresses the generation of coarse powder.

Hereinafter, a method of producing resin particles corresponding to both the methods of producing resin particles according to the first and second exemplary embodiments will be described in detail. Here, an example of the method of producing resin particles according to the exemplary embodiment of the present invention may be a method of producing resin particles corresponding to any one of the methods of producing resin particles according to the first and second embodiments.

First Step

The first step is a step of adding a monomer-containing emulsified liquid that contains a polymerizable monomer and an aqueous medium to an aqueous mother medium to polymerize the polymerizable monomer.

The first step is performed by using, for example, a reaction device capable of controlling the temperature.

The first step may be, for example, a step of adding a monomer-containing emulsified liquid to an aqueous mother medium contained in a reaction device and polymerizing a polymerizable monomer contained in the reaction solution (the solution containing the aqueous mother medium and the monomer-containing emulsified liquid).

In a case of the addition of the monomer-containing emulsified liquid to the aqueous mother medium, the method of adding the monomer-containing emulsified liquid is not particularly limited, but for example, it is preferable that the monomer-containing emulsified liquid is added using a liquid sending pipe of a reaction device from the viewpoint of reducing the temperature variation of the reaction solution.

It is preferable that the temperature condition for the reaction solution in a case of polymerization of the polymerizable monomer is, for example, appropriately selected according to the kinds of the polymerizable monomer and the polymerization initiator to be used.

It is preferable that the temperature condition for the reaction solution in the case of polymerization of the polymerizable monomer is set such that the temperature is, for example, 60° C. or higher and 80° C. or lower in a case where a styrene-based monomer and a (meth)acrylic acid-based monomer are used as the polymerizable monomers and ammonium persulfate is used as the polymerization initiator.

In a case of the addition of the monomer-containing emulsified liquid to the aqueous mother medium, the temperature of the aqueous mother medium is, for example, preferably 60° C. or higher and 80° C. or lower, more preferably 62° C. or higher and 75° C. or lower, and still more preferably 64° C. or higher and 70° C. or lower.

By setting the temperature of the aqueous mother medium to be in a numerical range of 60° C. or higher and 80° C. or lower, for example, the temperature condition of the reaction solution in a case of polymerization of the polymerizable monomer is likely to be preferable. Further, the temperature variation of the reaction solution is suppressed, and generation of coarse powder is more likely to be suppressed.

It is preferable that the polymerization initiator is added, for example, after the addition of the polymerizable monomer to the aqueous mother medium.

Examples of the polymerization initiator include known radical polymerization initiators such as a peroxide such as dibutyl peroxide, a persulfate such as sodium persulfate, and an azo compound such as 2,2'-azobis(2,4-dimethylvaleronitrile).

The amount of the radical polymerization initiator to used is, for example, preferably 1 part by mass or greater and more preferably 5 parts by mass or greater, and preferably 20 parts by mass or less and more preferably 15 parts by mass or less with respect to 100 parts by mass of the polymerizable monomer.

The addition amount of the monomer-containing emulsified liquid is, for example, preferably 100 parts by mass or greater and 300 parts by mass or less, more preferably 125 parts by mass or greater and 275 parts by mass or less, and still more preferably 150 parts by mass or greater and 250 parts by mass or less with respect to 100 parts by mass of the aqueous mother medium.

In the first step, for example, it is preferable that a first monomer-containing emulsified liquid containing a first polymerizable monomer as the polymerizable monomer is added to the aqueous mother medium to polymerize the first polymerizable monomer so that seed resin particles are generated and that a second monomer-containing emulsified liquid containing a second polymerizable monomer as the polymerizable monomer is added to the resin particles to polymerize the second polymerizable monomer.

The first step is performed according to the above-described procedures by generating seed resin particles and producing resin particles using the seed resin particles as nuclei, and thus generation of coarse powder is likely to be suppressed.

In a case where the first step is performed according to the above-described procedures, for example, it is preferable that the polymerization initiator is added after the addition of the first monomer-containing emulsified liquid.

Here, the composition of the first monomer-containing emulsified liquid containing the first polymerizable monomer and the composition of the second monomer-containing emulsified liquid containing the second polymerizable monomer may be the same as or different from each other.

As the first polymerizable monomer and the second polymerizable monomer, the polymerizable monomers described below can be used.

Further, as the first monomer-containing emulsified liquid and the second monomer-containing emulsified liquid, the monomer-containing emulsified liquids described below can be used.

In a case where the first monomer-containing emulsified liquid and the second monomer-containing emulsified liquid have an identical composition, the ratio of the addition amount of the first monomer-containing emulsified liquid to the addition amount of the second monomer-containing emulsified liquid (addition amount of first monomer-containing emulsified liquid/addition amount of second monomer-containing emulsified liquid) is, for example, preferably 0.5/100 or greater and 3.0/100 or less, more preferably 0.7/100 or greater 2.0/100 or less, and still more preferably 0.9/100 or greater and 1.5/100 or less on a mass basis.

Reaction Device

It is preferable that the reaction device is, for example, a reaction device capable of controlling the temperature.

Examples of the reaction device capable of controlling the temperature include a reaction device including a heating unit (a so-called jacket) on an outer peripheral portion of a reaction vessel.

The reaction vessel is a vessel that accommodates the aqueous mother medium and the monomer-containing emulsified liquid to polymerize the polymerizable monomer in the first step and accommodates the aqueous medium for cooling to produce resin particles in the second step.

The heating unit heats the vessel wall of the reaction vessel by allowing a heating fluid to flow inside the reaction vessel.

The heating unit is provided, for example, from the bottom to the side surface of the reaction vessel.

The form of the heating unit is not particularly limited as long as the vessel wall of the reaction vessel is heated such that the contents of the reaction vessel reaches a target temperature, and a known configuration is employed.

Further, it is preferable that the heating fluid introduced into the heating unit is, for example, water vapor, heated water, or the like.

It is preferable that the reaction device includes, for example, a stirring blade in the reaction vessel.

The form of the stirring blade is not particularly limited as long as the contents of the reaction vessel can be stirred, and a known stirring blade is employed.

The shape of the stirring blade is not particularly limited, and examples thereof include a paddle blade, a propeller blade, and a turbine blade.

It is preferable that the reaction device includes, for example, a liquid sending pipe.

The liquid sending pipe is used for sending the fluid from the outside of the reaction device into the reaction vessel of the reaction device.

The shape of the liquid sending pipe is not particularly limited, and examples thereof include a linear shape and a curved shape.

It is preferable that the reaction device includes, for example, a thermometer.

The thermometer is not particularly limited as long as the temperature of the contents contained in the reaction vessel can be measured, and a known thermometer is employed.

As the thermometer, a contact type thermometer is preferable, and for example, a thermocouple or the like is applied.

Hereinafter, the composition of the aqueous mother medium and the monomer-containing emulsified liquid will be described.

Aqueous Mother Medium

The aqueous mother medium is an aqueous medium to which the monomer-containing emulsified liquid is added.

The aqueous medium is a medium containing water.

Water

The water is not particularly limited, and ion exchange water, ultrapure water, distilled water, ultrafiltered water, or the like is used, but from the viewpoint of reducing the amount of ions remaining in the resin particles, for example, at least one of ion exchange water or ultrapure water is preferably used.

The content of water in the aqueous mother medium is, for example, preferably 90% by mass or greater and 100% by mass or less and more preferably 95% by mass or greater and 100% by mass or less with respect to the entire aqueous mother medium.

Water-Soluble Solvent

Water is mainly used as the aqueous mother medium, and water mixed with a water-soluble solvent may also be used. As the water-soluble solvent, alcohol such as methanol or ethanol, acetone, or the like is used.

The content of the water-soluble solvent in the aqueous mother medium is, for example, preferably 0% by mass or greater and 10% by mass or less and more preferably 0% by mass or greater and 5% by mass or less with respect to the entire aqueous mother medium.

Surfactant

From the viewpoint of stably performing emulsion polymerization, it is preferable that the aqueous mother medium contains, for example, a surfactant.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. A nonionic surfactant may be used in combination with an anionic surfactant or a cationic surfactant.

The surfactant may be used alone or in combination of two or more kinds thereof.

Among the examples, for example, an anionic surfactant is preferable, and a sulfonate-based anionic surfactant is more preferable.

Examples of the sulfonate-based anionic surfactant include the DOWFAX (registered trademark) series (manufactured by The Dow Chemical Company).

The content of the surfactant in the aqueous mother medium is, for example, preferably 0.1% by mass or greater and 5% by mass or less, more preferably 0.5% by mass or greater and 2.5% by mass or less, and still more preferably 0.7% by mass or greater and 1.5% by mass or less with respect to the entire aqueous mother medium.

Monomer-Containing Emulsified Liquid

The monomer-containing emulsified liquid contains a polymerizable monomer and an aqueous medium and, for example, preferably a surfactant as necessary.

Polymerizable Monomer

Examples of the polymerizable monomer include a radically polymerizable monomer.

The radically polymerizable monomer is a polymerizable monomer capable of radical polymerization.

As the radically polymerizable monomer, for example, a monomer containing a functional group having a carbon-carbon unsaturated bond is preferable.

Examples of the functional group having a carbon-carbon unsaturated bond include a (meth)acryloyl group, a vinyl group, an allyl group, and a methallyl group. Among the examples, from the viewpoint of improving the reactivity of radical polymerization, for example, at least one of a (meth)acryloyl group or a vinyl group is preferable.

From the viewpoint of controlling the viscoelasticity of the resin particles, the number of functional groups having a carbon-carbon unsaturated bond contained in the radically polymerizable monomer is, for example, preferably 1 or greater and 3 or less, more preferably 1 or greater and 2 or less, and still more preferably 1 per one molecule of the radically polymerizable monomer.

From the viewpoint of controlling the viscoelasticity of the resin particles, the monomer-containing emulsified liquid contains, for example, preferably at least one of a styrene-based monomer or a (meth)acrylic acid-based monomer and more preferable both a styrene-based monomer and a (meth)acrylic acid-based monomer as the radically polymerizable monomer.

Here, the styrene-based monomer indicates a monomer having a styrene skeleton (a structure in which one of six hydrogen atoms that benzene has been substituted with a vinyl group).

The (meth)acrylic acid-based monomer indicates a monomer containing a (meth)acryloyl group.

Examples of the styrene-based monomer include alkyl-substituted styrene having an alkyl chain such as styrene, α-methylstyrene, vinylnaphthalene, 2-methylstyrene, 3-methylstyrene, 4-methylstyrene, 2-ethylstyrene, 3-ethylstyrene, or 4-ethylstyrene, halogen-substituted styrene such as 2-chlorostyrene, 3-chlorostyrene, or 4-chlorostyrene, and fluorine-substituted styrene such as 4-fluorostyrene or 2,5-difluorostyrene. Among the examples, for example, styrene or α-methylstyrene is preferable.

Examples of the (meth)acrylic acid-based monomer include (meth)acrylic acid, n-methyl (meth)acrylate, n-ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, phenyl (meth)acrylate, biphenyl (meth)acrylate, diphenylethyl (meth)acrylate, t-butylphenyl (meth)acrylate, terphenyl (meth)acrylate, cyclohexyl (meth)acrylate, t-butylcyclohexyl (meth)acrylate, dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, (meth)acrylonitrile, and (meth)acrylamide. Among the examples, for example, n-butyl (meth)acrylate or β-carboxyethyl (meth)acrylate is preferable.

The content of the (meth)acrylic acid-based monomer is, for example, preferably 20% by mass or greater and 60% by mass or less, more preferably 30% by mass or greater and 57% by mass or less, and still more preferably 40% by mass or greater and 55% by mass or less with respect to the styrene-based monomer.

By setting the content of the (meth)acrylic acid-based monomer to be in a range of 20% by mass or greater and 60% by mass or less with respect to the styrene-based monomer, the polymerization of the polymerizable monomer tends to proceed even after completion of the addition of the monomer-containing emulsified liquid in the production of resin particles. Therefore, the temperature variation of the reaction solution is likely to increase, and thus coarse powder is likely to be generated.

According to the method of producing resin particles according to the present exemplary embodiment, even in a case where the content of the (meth)acrylic acid-based monomer is in a range of 20% by mass or greater and 60% by mass or less with respect to the styrene-based monomer, the temperature variation of the reaction solution can be reduced, and thus the generation of coarse powder can be suppressed.

The total content of the styrene-based monomer and the (meth)acrylic acid-based monomer is, for example, preferably 80% by mass or greater and 100% by mass or less, more preferably 90% by mass or greater and 100% by mass, and still more preferably 95% by mass or greater and 100% by mass or less with respect to the entire polymerizable monomer.

The content of the polymerizable monomer is, for example, preferably 50% by mass or greater and 80% by mass or less, more preferably 55% by mass or greater and 75% by mass or less, and still more preferably 60% by mass or greater and 70% by mass or less with respect to the entire monomer-containing emulsified liquid.

Aqueous Medium

The aqueous medium contains water.

As the water contained in the aqueous medium, the same water as that described in the section of the aqueous mother medium can be applied.

The content of water in the aqueous medium is, for example, preferably 90% by mass or greater and 100% by mass or less and more preferably 95% by mass or greater and 100% by mass or less with respect to the entire aqueous mother medium.

Water is mainly used as the aqueous medium, and water mixed with a water-soluble solvent may also be used. As the water-soluble solvent, alcohol such as methanol or ethanol, acetone, or the like is used.

The content of the water-soluble solvent in the aqueous medium is, for example, preferably 0% by mass or greater and 10% by mass or less and more preferably 0% by mass or greater and 5% by mass or less with respect to the entire aqueous medium.

The content of the aqueous medium is, for example, preferably 20% by mass or greater and 50% by mass or less, more preferably 25% by mass or greater and 45% by mass or less, and still more preferably 30% by mass or greater and 40% by mass or less with respect to the entire monomer-containing emulsified liquid.

Surfactant

From the viewpoint of stably performing emulsion polymerization, for example, it is preferable that the aqueous medium contains a surfactant.

As the surfactant contained in the aqueous medium, the same surfactant as that described in the section of the aqueous mother medium can be applied.

The content of the surfactant is, for example, preferably 0.5% by mass or greater and 10% by mass or less, more preferably 1.0% by mass or greater and 5% by mass or less, and still more preferably 1.5% by mass or greater and 3% by mass or less with respect to the entire monomer-containing emulsified liquid.

Second Step

The second step is a step of adding the aqueous medium for cooling to the aqueous mother medium after completion of the addition of the monomer-containing emulsified liquid to the aqueous mother medium.

The second step is performed using, for example, a reaction device capable of controlling the temperature.

Here, as the reaction device, the same reaction device as that described in the section of the first step can be applied.

The aqueous medium for cooling is a aqueous medium to be added to the aqueous mother medium (reaction solution) to cool the aqueous mother medium after completion of the addition of the monomer-containing emulsified liquid.

The aqueous medium for cooling contains water and, as necessary, a water-soluble solvent.

Water

The water is not particularly limited, and ion exchange water, ultrapure water, distilled water, ultrafiltered water, or the like is used, but from the viewpoint of reducing the amount of ions remaining in the resin particles, for example, at least one of ion exchange water or ultrapure water is preferably used.

The content of water in the aqueous medium for cooling is, for example, preferably 90% by mass or greater and 100% by mass or less and more preferably 95% by mass or greater and 100% by mass or less with respect to the entire aqueous medium for cooling.

Water is mainly used as the aqueous medium for cooling, and water mixed with a water-soluble solvent may also be used. As the water-soluble solvent, alcohol such as methanol or ethanol, acetone, or the like is used.

The content of the water-soluble solvent in the aqueous medium for cooling is, for example, preferably 0% by mass or greater and 10% by mass or less and more preferably 0% by mass or greater and 5% by mass or less with respect to the entire aqueous medium for cooling.

The method of adding the aqueous medium for cooling to the aqueous mother medium is not particularly limited, and from the viewpoint of reducing the temperature variation of the reaction solution, it is preferable that the addition is carried out using a liquid sending pipe of the reaction device.

In the second step, the aqueous medium for cooling is added to the aqueous mother medium, for example, preferably within 5 minutes after completion of the addition of the monomer-containing emulsified liquid to the aqueous mother medium, more preferably within 3 minutes after the completion, and still more preferably within 1 minute after the completion.

By adding the aqueous medium for cooling to the aqueous mother medium within 5 minutes after completion of the addition of the monomer-containing emulsified liquid to the aqueous mother medium, the temperature variation of the reaction solution is further suppressed even in a case where the polymerization of the monomer has proceeded after completion of the addition of the monomer-containing emulsified liquid. Therefore, the generation of coarse powder is more likely to be suppressed.

In a case where the first step is a step of adding the first monomer-containing emulsified liquid containing the first polymerizable monomer as the polymerizable monomer to the aqueous mother medium to polymerize the first polymerizable monomer so that seed resin particles are generated and adding the second monomer-containing emulsified liquid containing the second polymerizable monomer as the polymerizable monomer to polymerize the second polymerizable monomer, and in a case where the addition rate of the aqueous medium for cooling is defined as V1, the specific heat of the aqueous medium for cooling is defined as C1, the addition rate of the second monomer-containing emulsified liquid is defined as V2, and the specific heat of the second monomer-containing emulsified liquid is defined as C2 in the second step, for example, it is preferable to satisfy an expression of "$0.5 \leq V1C1/V2C2 \leq 1.5$, more preferable to satisfy "an expression of "$0.7 \leq V1C1/V2C2 \leq 1.3$", and still more preferable to satisfy "an expression of "$0.9 \leq V1C1/V2C2 \leq 1.1$".

By satisfying the expression of "$0.5 \leq V1C1/V2C2 \leq 1.5$", the same effect as the cooling effect of the reaction solution obtained by adding the monomer-containing emulsified liquid can be obtained by adding the aqueous medium for cooling. Therefore, even in a case where the polymerization of the monomer has proceeded after completion of the addition of the monomer-containing emulsified liquid, the temperature variation of the reaction solution is further suppressed. Therefore, the generation of coarse powder is more likely to be suppressed.

Here, the unit of the addition rates V1 and V2 is "parts/min", and the unit of the specific heats C1 and C2 is "J/(kg·K)".

In a case where the addition rate is changed during the addition of the aqueous medium for cooling or the second monomer-containing emulsified liquid, the addition rates V1 and V2 are the arithmetic average values of the addition rates for every minute immediately after the start of the addition to the completion of the addition.

The specific heats C1 and C2 are measured using a calorimeter.

As the calorimeter, for example, DSC-60A (product name, manufactured by Shimadzu Corporation) can be used.

Hereinafter, the procedure for measuring the specific heat will be described.

In the differential scanning calorimetry, the temperature is increased from 0° C. to 150° C. at a rate of 10° C./min, and the specific heat is acquired from the ratio between the signal displacement of the DSC curve of a reference sample and the mass of the reference sample and the signal displacement of the DSC curve of an unknown sample and the mass of the unknown sample.

It is preferable that the addition rate V1 of the aqueous medium for cooling is changed according to, for example, the amount of the aqueous mother medium (reaction solution) after completion of the addition of the monomer-containing emulsified liquid.

The ratio of the amount (part) of the reaction solution to the addition rate V1 (amount (part) of reaction solution: addition rate V1) is, for example, preferably 250 or greater and 1400 or less, more preferably 280 or greater and 550 or less, and still more preferably 300 or greater and 400 or less.

It is preferable that the addition rate V2 of the second monomer-containing emulsified liquid is changed according to, for example, the amount of the aqueous mother medium after completion of the addition of the first monomer-containing emulsified liquid.

The ratio of the amount (part) of the aqueous mother medium after completion of the addition of the first monomer-containing emulsified liquid to the addition rate V2 (amount (part) of reaction solution:addition rate V2) is, for example, preferably 70 or greater and 140 or less, more preferably 80 or greater and 120 or less, and still more preferably 85 or greater and 105 or less.

In the second step, in a case where an absolute value ($|Tp-Tm|$) of a difference between a set temperature Tp of the aqueous mother medium and a measured temperature Tm of the aqueous mother medium after completion of the addition of the monomer-containing emulsified liquid is defined as $\Delta T$, for example, it is preferable that $\Delta T$, V1, and an addition amount V3 of the aqueous medium for cooling in a case of a change in temperature of the aqueous mother medium by $\Delta T$ satisfy Equation (1) and Expression (2).

$$V3 = V1 \times a \times \Delta T \quad \text{Equation (1):}$$

$$5.6 \leq a \leq 7.0 \quad \text{Expression (2):}$$

Here, the unit of $\Delta T$ is "° C.", and a is a dimensionless number.

The unit of V3 calculated by Equation (1) is originally "part/° C./min", but in the present specification, the unit of V3 is converted to "part".

By satisfying Equation (1) and Expression (2), even in a case where the polymerization of the monomer has proceeded after completion of the addition of the monomer-containing emulsified liquid, the temperature variation of the reaction solution is further suppressed. Therefore, the generation of coarse powder is more likely to be suppressed.

From the viewpoint of further suppressing generation of coarse powder, ΔT, V1, and V3 satisfy, for example, preferably Equation (1) and Expression (2-2) and more preferably Equation (1) and Expression (2-3).

$$5.8 \leq a \leq 6.8 \quad \text{Expression (2-2):}$$

$$6.0 \leq a \leq 6.6 \quad \text{Expression (2-3):}$$

Here, the set temperature Tp is a target value of the temperature of the contents contained in the reaction vessel provided in the reaction device. The set temperature is set in the reaction device.

Further, the measured temperature Tm is the actual temperature of the contents contained in the reaction vessel provided in the reaction device. The measured temperature is measured by a thermometer provided in the reaction device.

In a case where the measured temperature of the aqueous mother medium at the time point of completion of the addition of the monomer-containing emulsified liquid is defined as Tm (0), the temperature of the aqueous medium for cooling is, for example, preferably Tm (0)−50° C. or higher and Tm (0)−30° C. or lower, more preferably Tm (0)−45° C. or higher and Tm (0)−35° C. or lower, and still more preferably Tm (0)−40° C. or higher and Tm (0)−40° C. or lower.

By setting the temperature of the aqueous medium for cooling to be in a range of Tm (0)−50° C. or higher and Tm (0)−30° C. or lower, a difference in temperature between the reaction solution and the aqueous medium for cooling is not extremely large, and an appropriate cooling effect is also obtained. Therefore, even in a case where the polymerization of the monomer has proceeded after completion of the addition of the monomer-containing emulsified liquid, the temperature variation of the reaction solution is further suppressed. Therefore, the generation of coarse powder is more likely to be suppressed.

The temperature of the aqueous medium for cooling is, for example, preferably 10° C. or higher and 45° C. or lower, more preferably 15° C. or higher and 40° C. or lower, and still more preferably 20° C. or higher and 35° C. or lower.

By setting the temperature of the aqueous medium for cooling to 10° C. or higher and 45° C. or lower, a difference in temperature between the reaction solution and the aqueous medium for cooling is not extremely large, and an appropriate cooling effect is also obtained. Therefore, even in a case where the polymerization of the monomer has proceeded after completion of the addition of the monomer-containing emulsified liquid, the temperature variation of the reaction solution is further suppressed. Therefore, the generation of coarse powder is more likely to be suppressed.

Addition Method from Liquid Sending Pipe

For example, it is preferable that the monomer-containing emulsified liquid and the aqueous medium for cooling are added to the aqueous mother medium from the identical liquid sending pipe.

The temperature variation of the reaction solution is likely to be reduced by adding the monomer-containing emulsified liquid and the aqueous medium for cooling from the identical liquid sending pipe. Therefore, the generation of coarse powder is further suppressed.

Here, for example, it is preferable that the end of the liquid sending pipe on the liquid discharge side is immersed in the aqueous mother medium.

By immersing the end of the liquid sending pipe on the liquid discharge side in the aqueous mother medium, the monomer-containing emulsified liquid and the aqueous medium for cooling are easily added to the aqueous mother medium at a target temperature in a case of the addition of the monomer-containing emulsified liquid and the aqueous medium for cooling. Therefore, the temperature variation of the aqueous mother medium is likely to be further reduced. Therefore, the generation of coarse powder is further suppressed.

Method of Producing Resin Particles According to Second Exemplary Embodiment

The method of producing resin particles according to the second exemplary embodiment includes a step of adding a monomer-containing emulsified liquid that contains polymerizable monomers and an aqueous medium to the aqueous mother medium to polymerize the polymerizable monomers.

Further, the polymerizable monomers are a styrene-based monomer and a (meth)acrylic acid-based monomer, and the content of the (meth)acrylic acid-based monomer 20% by mass or greater and 60% by mass or less with respect to the styrene-based monomer.

Further, the temperature of the aqueous mother medium after the addition of the monomer-containing emulsified liquid is maintained within a range of a set temperature ±1.5° C.

The step of adding the monomer-containing emulsified liquid containing the polymerizable monomer and the aqueous medium to the aqueous mother medium to polymerize the polymerizable monomer in the method of producing resin particles according to the second exemplary embodiment is the same step as the first step described above.

The polymerizable monomers are a styrene-based monomer and a (meth)acrylic acid-based monomer, and the content of the (meth)acrylic acid-based monomer is 20% by mass or greater and 60% by mass or less with respect to the styrene-based monomer, but from the viewpoint of suppressing the generation of coarse powder, the content of the (meth)acrylic acid-based monomer is, for example, more preferably 30% by mass or greater and 57% by mass or less and still more preferably 40% by mass or greater and 55% by mass or less.

The temperature of the aqueous mother medium (reaction solution) after the addition of the monomer-containing emulsified liquid is maintained at a temperature within a range of the set temperature ±1.5° C., but from the viewpoint of suppressing the generation of coarse powder, the temperature is maintained, for example, preferably at a temperature within a range of the set temperature ±1.25° C., more preferably at a temperature within a range of the set temperature ±1.00° C., and still more preferably at a temperature within a range of the set temperature ±0.75° C.

Examples of a method of maintaining the temperature of the reaction solution within a range of the set temperature ±1.5° C. include a method of adding the aqueous medium for cooling to the aqueous mother medium after completion of the addition of the monomer-containing emulsified liquid to the aqueous mother medium.

Resin Particles
Resin

As the resin particles, for example, particles containing a resin obtained by polymerizing the above-described polymerizable monomer are preferable, and from the viewpoint of setting the viscoelasticity to be in a preferable range, for example, particles containing a styrene-(meth)acrylic copolymer resin is more preferable.

The styrene-(meth)acrylic copolymer resin is a resin obtained by polymerizing a styrene-based monomer and a (meth)acrylic acid-based monomer.

Further, the resin containing a styrene-(meth)acrylic copolymer resin is referred to as a styrene (meth)acrylic copolymer resin particles.

Particle Diameter

The volume average particle diameter of the resin particles is, for example, preferably 80 nm or greater and 300 nm or less, more preferably 100 nm or greater and 250 nm or less, and still more preferably 120 nm or greater and 200 nm or less.

The volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.).

Coarse Powder

The amount of coarse powder in the resin particles on the 200 mesh net is, for example, preferably 1% or less, more preferably 0.5% or less, and still more preferably 0.3% or less.

In a case where the amount of coarse particle in the resin particles on the 200 mesh net is 1% or less, the amount of coarse powder contained in the resin particles is reduced.

The procedure for measuring the amount of coarse powder on the 200 mesh net is as follows.

A solution in which the resin particles to be measured (resin particle dispersion liquid) is allowed to pass through a 200 mesh nylon net (NYTAL (200 μm), manufactured by Tanaka Sanjiro Co., Ltd.). The resin particles remaining on the net per 100 parts of the resin particle dispersion liquid are collected. The collected resin particles are dried with a vacuum dryer, the mass is measured, and the amount of coarse powder on the 200 mesh net is acquired according to the expression of "mass (parts) of collected resin particles/ (100 parts of resin particle dispersion liquid x solid content (% by mass))".

Method of Producing Electrostatic Charge Image Developing Toner

The method of producing a the electrostatic charge image developing toner according to the present exemplary embodiment includes a step of aggregating at least resin particles in a dispersion liquid containing the resin particles obtained by the above-described method of producing resin particles to form aggregated particles (aggregated particle formation step), and a step of heating an aggregated particle dispersion liquid in which the aggregated particles are dispersed and fusing and coalescing the aggregated particles to form toner particles (fusion and coalescence step).

The toner according to the present exemplary embodiment can be obtained by externally adding the external additive to the toner particles as necessary after the production of the toner particles.

The toner particles may be produced by any of a dry production method (for example, a kneading and pulverizing method) or a wet production method (for example, an aggregation and coalescence method, a suspension polymerization method, or a dissolution suspension method). The method of producing the toner particles is not particularly limited to such production methods, and a well-known production method is employed.

Among the examples, the toner particles may be obtained by, for example, the aggregation and coalescence method.

Specifically, for example, in a case where the toner particles are produced by the aggregation and coalescence method, the toner particles are produced by performing a step of preparing a resin particle dispersion liquid in which resin particles serving as a binder resin are dispersed and a specific resin particle dispersion liquid in which the resin particles obtained by the method of producing resin particles according to the present exemplary embodiment (hereinafter, also referred to as the specific resin particles) are dispersed (resin particle dispersion liquid preparation step), a step of allowing the resin particles (other particles as necessary) to be aggregated in the resin particle dispersion liquid (in a dispersion liquid which has been mixed with another particle dispersion liquid as necessary) to form aggregated particles (aggregated particle formation step), and a step of heating the aggregated particle dispersion liquid in which the aggregated particles are dispersed and fusing and coalescing the aggregated particles to form toner particles (fusion and coalescence step).

The details of each step will be described below.

In the following description, a method of obtaining toner particles containing a colorant and a release agent will be described, but the colorant and the release agent are used as necessary. It is needless to say that additives other than the colorant and the release agent may be used.

Resin Particle Dispersion Liquid Preparation Step

First, for example, a colorant particle dispersion liquid in which the colorant particles are dispersed and a release agent particle dispersion liquid in which the release agent particles are dispersed are prepared together with the resin particle dispersion liquid in which the resin particles serving as the binder resin are dispersed.

Here, the resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having media, a sand mill, and a dyno mill. Further, depending on the kind of resin particles, the resin particles may be dispersed in a resin particle dispersion liquid by a phase inversion emulsification method.

Further, the phase inversion emulsification method is a method of dissolving the resin to be dispersed in a hydrophobic organic solvent in which the resin is soluble, adding a base to an organic continuous phase (O phase) for neutralization, adding an aqueous medium (W phase) thereto, performing conversion of the resin (so-called phase inversion) from W/O to O/W to obtain a discontinuous phase, and dispersing the resin in the aqueous medium in the form of particles.

The volume average particle diameter of the resin particles to be dispersed in the resin particle dispersion liquid is, for example, preferably 0.01 μm or greater and 1 μm or less, more preferably 0.08 μm or greater and 0.8 μm or less, and still more preferably 0.1 μm or greater and 0.6 μm or less.

Further, the volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

In addition, similar to the resin particle dispersion liquid, for example, the colorant particle dispersion liquid and the release agent particle dispersion liquid are also prepared. That is, the same applies to the colorant particles to be dispersed in the colorant particle dispersion liquid and the release agent particles to be dispersed in the release agent particle dispersion liquid in terms of the volume average particle diameter of particles in the resin particle dispersion liquid, the dispersion medium, the dispersion method, and the content of the particles.

The specific resin particle dispersion liquid may be obtained by dispersing the specific resin particles obtained by the method of producing resin particles according to the present exemplary embodiment in a dispersion medium, and for example, the aqueous mother medium containing the specific resin particles obtained in the second step may be used as the specific resin particle dispersion liquid in the method of producing resin particles according to the present exemplary embodiment.

Aggregated Particle Formation Step

Next, the resin particle dispersion liquid, the colorant particle dispersion liquid, the release agent particle dispersion liquid, and the specific resin particle dispersion liquid are mixed.

Further, the resin particles, the colorant particles, the release agent particles, and the specific resin particles are heteroaggregated in the mixed dispersion liquid to form aggregated particles including the resin particles, the colorant particles, the release agent particles, and the specific resin particles, which have a diameter close to the diameter of the target toner particles.

Specifically, for example, the aggregated particles are formed by adding an aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to the glass transition temperature of the resin particles (specifically, for example, a temperature higher than or equal to the glass transition temperature of the resin particles −30° C. and lower than or equal to the glass transition temperature thereof −10° C.) and allowing the particles dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the aggregating agent include a surfactant having a polarity opposite to the polarity of the surfactant used as a dispersant to be added to the mixed dispersion liquid, an inorganic metal salt, and a divalent or higher valent metal complex. Particularly, in a case where a metal complex is used as the aggregating agent, the amount of the surfactant to be used is reduced, and the charging characteristics are improved.

An additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The addition amount of the chelating agent is, for example, preferably 0.01 parts by mass or greater and 5.0 parts by mass or less and more preferably 0.1 parts by mass or greater and less than 3.0 parts by mass with respect to 100 parts by mass of the resin particles.

Fusion and Coalescence Step

Next, the aggregated particle dispersion liquid in which the aggregated particles are dispersed is heated to, for example, a temperature higher than or equal to the glass transition temperature of the resin particles (for example, a temperature higher than the glass transition temperature of the resin particles by 10° C. to 30° C.) and the aggregated particles are fused and coalesced, thereby forming toner particles.

The toner particles are obtained by performing the above-described steps.

Further, the toner particles may be produced by performing a step of obtaining the aggregated particle dispersion liquid in which the aggregated particles are dispersed, further mixing the aggregated particle dispersion liquid with the resin particle dispersion liquid in which the resin particles are dispersed, and allowing the resin particles to be aggregated such that the resin particles are further attached to the surface of each aggregated particle to form second aggregated particles and a step of heating the second aggregated particle dispersion liquid in which the second aggregated particles are dispersed and fusing and coalescing the second aggregated particle to form toner particles having a core-shell structure.

After completion of the fusion and coalescence step, toner particles in a dry state are obtained by performing a known cleaning step, a known solid-liquid separation step, and a known drying step on the toner particles formed in the solution.

From the viewpoint of the charging properties, for example, displacement cleaning may be sufficiently performed as the cleaning step using ion exchange water. The solid-liquid separation step is not particularly limited, but from the viewpoint of the productivity, suction filtration, or pressure filtration may be performed. The drying step is not particularly limited, but from the viewpoint of the productivity, freeze-drying, flush drying, fluidized drying, vibratory fluidized drying, or the like may be performed as the drying step.

The toner according to the present exemplary embodiment is produced, for example, by adding an external additive to the obtained toner particles in a dry state and mixing the external additive with the toner particles. The mixing may be performed, for example, using a V blender, a Henschel mixer, a Lödige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer obtained by mixing the toner and a carrier.

The carrier is not particularly limited, and examples thereof include known carriers. Examples of the carrier include a coated carrier obtained by coating the surface of a core material consisting of magnetic powder with a coating resin, a magnetic powder dispersion type carrier obtained by dispersing magnetic powder in a matrix resin so as to be blended, and a resin impregnation type carrier obtained by impregnating porous magnetic powder with a resin.

Further, each of the magnetic powder dispersion type carrier and the resin impregnation type carrier may be a carrier obtained by coating the surface of the particle constituting the carrier, serving as a core material, with a coating resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond, a product obtained by modifying the straight silicone resin, a fluororesin, polyester, polycarbonate, a phenol resin, and an epoxy resin.

Further, the coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

Here, the surface of a core material is coated with a coating resin by, a method of coating the surface with a solution for forming a coating layer, which is obtained by dissolving a coating resin and various additives as necessary in an appropriate solvent. The solvent is not particularly limited, and may be selected in consideration of the coating resin to be used, coating suitability, and the like.

Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Electrostatic Charge Image Developing Toner

The electrostatic charge image developing toner according to the present exemplary embodiment (hereinafter, also referred to as the "toner") has toner particles containing a binder resin, a release agent, and resin particles.

Toner Particles

The toner particles contain a binder resin, a release agent, and specific resin particles and as necessary, a colorant and other additives.

Binder Resin

Examples of the binder resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of such monomers.

Other examples of the binder resin include non-vinyl-based resins such as an epoxy resin, a polyester resin, a polyurethane resin, a polyamide resin, a cellulose resin, a polyether resin, and modified rosin, mixtures of such resins with the above-described vinyl resins, and graft polymers obtained by polymerizing vinyl-based monomers in the coexistence of such resins.

Such binder resins may be used alone or in combination of two or more kinds thereof.

It is preferable that the binder resin contains, for example, a polyester resin.

Release Agent

Examples of the release agent include hydrocarbon-based wax; natural wax such as carnauba wax, rice wax, or candelilla wax; synthetic or mineral/petroleum wax such as montan wax; and ester-based wax such as fatty acid ester or montanic acid ester. The release agent is not limited thereto.

The melting temperature of the release agent is, for example, preferably 50° C. or higher and 110° C. or lower and more preferably 60° C. or higher and 100° C. or lower.

Further, the melting temperature is acquired from the DSC curve obtained by differential scanning calorimetry (DSC) according to the "melting peak temperature" described in the method of acquiring the melting temperature in JIS K 7121-1987 "Method of measuring transition temperature of plastics".

The content of the release agent is, for example, preferably 1% by mass or greater and 20% by mass or less and more preferably 5% by mass or greater and 15% by mass or less with respect to the entirety of the toner particles.

Specific Resin Particles

As the specific resin particles, the specific resin particles produced by the method described above are applied.

The content of the specific resin particles is, for example, preferably 1% by mass or greater and 20% by mass or less and more preferably 5% by mass or greater and 15% by mass or less with respect to the entirety of the toner particles.

Other Additives

Examples of other additives include known additives such as a magnetic material, a charge control agent, and inorganic powder. Such additives are contained in the toner particles as internal additives.

Characteristics and the Like of Toner Particles

The toner particles may be toner particles having a single layer structure or toner particles having a so-called core-shell structure formed of a core portion (core particle) and a coating layer (shell layer) covering the core portion.

Here, the toner particles having a core-shell structure may be formed of, for example, a core portion containing a binder resin and, as necessary, other additives such as a colorant and a release agent, and a coating layer containing a binder resin.

The volume average particle diameter (D50v) of the toner particles is, for example, preferably 2 μm or greater and 10 μm or less and more preferably 4 μm or greater and 8 μm or less.

Further, various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5% aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. Further, the number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter)[(perimeter of circle having same projected area as particle image)/(perimeter of projected particle image)]. Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

Further, in a case where the toner has an external additive, the toner (developer) to be measured is dispersed in water containing a surfactant, and an ultrasonic treatment is performed, thereby obtaining toner particles from which the external additive has been removed.

External Additive

Examples of the external additive include inorganic particles. Examples of the inorganic particles include $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the inorganic particle serving as the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. Such hydrophobic treatment agent may be used alone or in combination of two or more kinds thereof.

The amount of the hydrophobic treatment agent is, for example, typically 1 part by mass or greater and 10 parts by mass or less with respect to 100 parts by mass of the inorganic particles.

Examples of external additives also include resin particles (resin particles such as polystyrene, polymethylmethacrylate (PMMA), and melamine resins) and a cleaning activator (for example, a metal salt of a higher fatty acid represented by zinc stearate or fluorine-based polymer particles).

The amount of the external additive to be externally added is, for example, preferably 0.01% by mass or greater and 5% by mass or less and more preferably 0.01% by mass or greater and 2.0% by mass or less with respect to the entirety of the toner particles.

EXAMPLES

Hereinafter, exemplary embodiments will be described based on examples, but the present invention is not limited to the examples. Further, in the following description, "parts" and "%" are on a mass basis unless otherwise specified.

Example 1

Preparation of Specific Resin Particle Dispersion Liquid 1
First Step 2800 parts of ion exchange water and 23 parts of DOW-FAX 2A1 (manufactured by The Dow Chemical Company, sulfonate-based anionic surfactant) are added to a reaction vessel of a reaction device provided with a jacket, a stirring blade, a liquid sending pipe, and a thermometer, thereby preparing an aqueous mother medium. Here, the end of the liquid sending pipe on the liquid discharge side is immersed in the aqueous mother medium.

The aqueous mother medium is stirred at 50 rpm and heated to 65° C. Further, a polymerizable monomer (a mixture of 1800 parts of styrene and 1800 parts of n-butyl acrylate), 1700 parts of ion exchange water, and 90 parts of DOWFAX 2A1 are mixed in an emulsification vessel (an emulsification device having a stirring blade) provided separately from the reaction device by being stirred at room temperature (25° C.) and 100 rpm for 60 minutes, thereby preparing a monomer-containing emulsified liquid.

Next, 60 parts of the first monomer-containing emulsified liquid is taken out from the monomer-containing emulsified liquid, and the first monomer-containing emulsified liquid is added to the reaction vessel by a pump using a liquid sending pipe over 2 minutes. After 5 minutes from the addition of the first monomer-containing emulsified liquid, a polymerization initiator aqueous solution prepared by dissolving 15 parts of ammonium persulfate in 130 parts of ion exchange water is added to the reaction vessel using a liquid sending pipe over 10 minutes. The solution in the reaction vessel is stirred for 30 minutes to generate seed resin particles.

Next, the remaining monomer-containing emulsified liquid (second monomer-containing emulsified liquid) is added to the reaction vessel at an addition rate V2 of 30 parts/min using a liquid sending pipe.

Second Step

Immediately after completion of the addition of the total amount of the monomer-containing emulsified liquid, 1500 parts of ion exchange water (aqueous medium for cooling) is started to be added dropwise to the reaction vessel using a liquid sending pipe at an addition rate of 19.5 parts/min. The measured temperature Tm (hereinafter, also referred to as the internal temperature) of the aqueous mother medium is monitored every minute, and the addition rate V1 of the ion exchange water is changed such that Equation (1) of "V3=V1×a×ΔT" and Expression (2) of "5.6≤a≤7.0" are satisfied. Further, the set temperature Tp of the aqueous mother medium is set to 65° C. After completion of the addition of ion exchange water, the solution in the reaction vessel is post-heated at 65° C. for 180 minutes to complete the reaction and then cooled. After the cooling, ion exchange water is added to the solution to adjust the concentration of solid contents to 20%, thereby obtaining a specific resin particle dispersion liquid 1.

Here, the above-described series of operations are performed in a nitrogen atmosphere by allowing a nitrogen gas stream to flow into the reaction vessel.

Preparation of Toner and Developer

Preparation of Polyester Resin Particle Dispersion Liquid 80 parts by mole of polyoxypropylene (2,2)-2,2-bis(4-hydroxyphenyl)propane, 10 parts by mole of ethylene glycol, 10 parts by mole of cyclohexanediol, 80 parts by mole of terephthalic acid, 10 parts by mole of isophthalic acid, and 10 parts by mole of n-dodecenyl succinic acid are put into a reaction container provided with a stirrer, a thermometer, a condenser, and a nitrogen gas introduction tube, and the inside of the reaction container is substituted with dry nitrogen gas. Thereafter, 0.25 parts by mass of titanium tetrabutoxide serving as a catalyst is put into 100 parts by mass of the monomer component. The mixture is stirred and allowed to react at 170° C. for 3 hours in a nitrogen gas stream and further heated to a temperature of 210° C. for 1 hour, the pressure the inside of the reaction container is reduced to 3 kPa, and the mixture is stirred and allowed to react under reduced pressure for 13 hours, thereby obtaining a polyester resin.

Next, 200 parts by mass of a polyester resin, 100 parts by mass of methyl ethyl ketone, and 70 parts by mass of isopropyl alcohol are added to a 3 L reaction vessel provided with a jacket (BJ-30N, manufactured by Tokyo Rikakikai Co., Ltd.) including a condenser, a thermometer, a water dripping device, and an anchor blade and mixed by being stirred at 100 rpm while being maintained at 70° C. in a water circulation type constant temperature vessel so that the resin is dissolved. Thereafter, the stirring rotation speed is set to 150 rpm, the temperature of the water circulation type constant temperature vessel is set to 66° C., 10 parts of 10% ammonia water (reagent) is added to the vessel over 10 minutes, and a total of 600 parts by mass of ion exchange water which has been warmed to 66° C. is added dropwise to the solution at a rate of 5 parts by mass/min for phase inversion, thereby obtaining an emulsified liquid. 600 parts of the obtained emulsified liquid and 525 parts by mass of ion exchange water are added to a 2 L eggplant flask, and the flask is set in an evaporator (manufactured by Tokyo Rikakikai Co., Ltd.) provided with a vacuum control unit via a trap ball. The eggplant flask is heated in a hot water bath at 60° C. while rotating and decompressed to 7 kPa while paying attention to sudden boiling to remove the solvent. The pressure is returned to normal pressure at the time point at which the solvent recovery amount reached 825 parts, and the eggplant flask is water-cooled to obtain a dispersion liquid. Ion exchange water is added, thereby obtaining a polyester resin particle dispersion liquid having a concentration of solid contents of 20% by mass.

Preparation of Crystalline Polyester Resin Particle Dispersion Liquid 1,10-Decanedicarboxylic acid: 260 parts 1,6-Hexanediol: 167 parts Dibutyl tin oxide (catalyst): 0.3 parts The above-described materials are added to a heated and dried three-neck flask, the air in the three-neck flask is substituted with nitrogen gas to prepare an inert atmosphere, and the mixture is stirred and refluxed at 180° C. for 5 hours by mechanical stirring. Thereafter, the mixture is gradually heated to 230° C. under reduced pressure, stirred for 2 hours, and air-cooled when the mixture enters a viscous state to stop the reaction. In this manner, a crystalline polyester resin having a weight-average-molecular weight of 12600 and a melting temperature of 73° C. is obtained. 90 parts of the crystalline polyester resin, 1.8 parts of an anionic surfactant (TaycaPower, manufactured by Tyaca Corporation), and 210 parts of ion exchange water are mixed, heated to 120° C. to be dispersed using a homogenizer (Ultraturrax T50, manufactured by IKA), and subjected to a dispersion treatment using a pressure discharge type Gaulin homogenizer for 1 hour, thereby obtaining a resin particle dispersion liquid in which resin particles having a volume average particle diameter of 160 nm are dispersed. Ion exchange water is added to the resin particle dispersion liquid to adjust the solid content to 20%, thereby obtaining a crystalline polyester resin particle dispersion liquid.

Preparation of Release Agent Dispersion Liquid

Paraffin wax (FNP92, manufactured by Nippon Seiro Co., Ltd., endothermic peak onset at 81° C.): 45 parts Anionic surfactant (NEOGEN RK, manufactured by DKS Co., Ltd.): 5 parts Ion exchange water: 200 parts The above-described materials are mixed, heated to 95° C., and dispersed using a homogenizer (Ultraturrax T50, manufactured by IKA). Thereafter, the mixture is subjected to a dispersion treatment using a Manton Gaulin high-pressure homogenizer (manufactured by Gaulin) such that the release agent is dispersed, thereby preparing a release agent dispersion liquid 1 (concentration of solid contents: 20%). The volume average particle diameter of the release agent particles is 0.19 μm.

Preparation of Colorant Dispersion Liquid

Cyan pigment (Pigment Blue 15:3 (copper phthalocyanine), manufactured by Dainichiseika Color & Chemicals Mfg. Co., Ltd.): 98 parts Anionic surfactant (NEOGEN R, manufactured by DKS Co., Ltd.): 2 parts Ion exchange water: 400 parts The above-described materials are mixed and dissolved by being dispersed using a homogenizer (Ultraturrax, manufactured by IKA) for 10 minutes, thereby obtaining a colorant dispersion liquid having a center particle diameter of 0.16 μm and a solid content of 20%.

Preparation of Carrier 100 parts of ferrite particles (manufactured by Powder Tech K. K., average particle diameter of 50 μm), 1.5 parts of a polymethyl methacrylate resin (manufactured by Mitsubishi Rayon Co., Ltd., weight-average-molecular weight of 95,000, the proportion of components with a weight-average-molecular weight of 10,000 or less is 5%), and 500 parts of toluene are added to a pressurized kneader, stirred and mixed at room temperature for 15 minutes, heated to 70° C. while being mixed under reduced pressure so that the toluene is distilled off, and cooled, and classified using a sieve having an opening size of 105 μm, thereby obtaining a resin-coated ferrite carrier.

Preparation of Toner

Preparation of Toner Particles (1)

Polyester resin particle dispersion liquid: 100 parts by mass

Crystalline polyester resin particle dispersion liquid: 20 parts by mass

Specific resin particle dispersion liquid 1:40 parts by mass

Colorant particle dispersion liquid: 10 parts by mass

Release agent particle dispersion liquid: 9 parts by mass

Anionic surfactant (TaycaPower BN2060, manufactured by Tayca Corporation): 1 part by mass Ion exchange water: 200 parts by mass The above-described raw materials are added to a 2 L cylindrical stainless steel container 1, and 3 parts of a 0.3 M nitric acid aqueous solution is added thereto adjust the pH to 3.0.

Next, 50 parts of a 10% aluminum sulfate aqueous solution is added dropwise to the solution as an aggregating agent while a shearing force is applied thereto at 6000 rpm using (Ultraturrax, manufactured by IKA), and the solution is stirred for 5 minutes.

The above-described raw material mixture is heated to 45° C. with a mantle heater and maintained for 30 minutes, and a resin particle dispersion liquid for coating prepared for applying aggregated particles by mixing 25 parts of a polyester resin dispersion liquid and 10 parts of ion exchange water and adjusting the pH of the solution to 3.0 in advance is added thereto and maintained for 10 minutes. Thereafter, a 1 M sodium hydroxide aqueous solution is added thereto in order to stop the growth of the applied aggregated particles (attached particles), and the pH of the raw material mixture is controlled to 8.0. Next, the mixture is heated to 80° C. at a temperature rising rate of 1° C./min in order to fuse the aggregated particles. The average circularity is measured every 30 minutes after the temperature reaches 80° C., and the state is maintained until the average circularity reaches 0.966. Thereafter, the toner dispersion liquid is cooled to 40° C. at a cooling rate A1 of 60° C./min using a heat exchanger. Further, a 0.3 M nitric acid aqueous solution is added thereto to adjust the pH, and the solution is heated to 57° C. The pH of the solution is measured, and the value is 7.5. Thereafter, the solution is maintained for 1 hour and cooled to 40° C. Next, an operation of filtering the solution, redispersing the filtrate in 3 L of ion exchange water, and performing solid-liquid separation by Nutsche-type suction filtration is repeated 6 times, thereby obtaining a wet cake. Next, the wet cake is vacuum-dried for 12 hours, thereby obtaining toner mother particles (1) having an average volume particle diameter of 6.0 μm and an average circularity of 0.966.

Next, 1.5 parts by weight of hydrophobic silica (TS720, manufactured by Cabot Corporation) is added to 50 parts by weight of the toner mother particles and blended using a sample mill, thereby obtaining an externally added toner. Next, the externally added toner and the resin-coated ferrite carrier are mixed to prepare a developer having a toner concentration of 7% by weight.

Example 2

Preparation of Specific Resin Particle Dispersion Liquid 2

A specific resin particle dispersion liquid 2 is prepared by the same method as in Example 1 except that 1500 parts of ion exchange water (aqueous medium for cooling) is started to be added dropwise to a reaction vessel using a liquid sending pipe at an addition rate V1 of 19.5 parts/min after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 2.

Example 3

Preparation of Specific Resin Particle Dispersion Liquid 3

A specific resin particle dispersion liquid 3 is prepared by the same method as in Example 1 except that 1500 parts of ion exchange water (aqueous medium for cooling) is started to be added dropwise to a reaction vessel using a liquid sending pipe at an addition rate V1 of 29.3 parts/min immediately after completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 3.

Example 4

Preparation of Specific Resin Particle Dispersion Liquid 4

A specific resin particle dispersion liquid 4 is prepared by the same method as in Example 1 except that 1500 parts of ion exchange water (aqueous medium for cooling) is started to be added dropwise to a reaction vessel using a liquid sending pipe at an addition rate V1 of 9.8 parts/min after completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 4.

Example 5

Preparation of Specific Resin Particle Dispersion Liquid 5

A specific resin particle dispersion liquid 5 is prepared by the same method as in Example 1 except that ion exchange water (aqueous medium for cooling) is started to be added dropwise at an addition rate of 19.5 parts/min immediately after completion of the addition of the total amount of the monomer-containing emulsified liquid in the second step, the internal temperature is monitored every minute, and the addition rate V1 of the ion exchange water is changed based on Equations (1): $V3=V1 \times a \times \Delta T$ and Equation $a=7.0$.

Preparation of Toner and Developer

A toner and a developer are obtained by the same method as in Example 1 except that the kind of the specific resin particle dispersion liquid to be added for preparation of the toner particles is changed to the specific resin particle dispersion liquid 5.

Example 6

Preparation of Specific Resin Particle Dispersion Liquid 6

A specific resin particle dispersion liquid 6 is prepared by the same method as in Example 1 except that ion exchange water (aqueous medium for cooling) is started to be added dropwise at an addition rate of 19.5 parts/min immediately after completion of the addition of the total amount of the monomer-containing emulsified liquid in the second step, the internal temperature is monitored every minute, and the addition rate V1 of the ion exchange water is changed based on Equations (1): $V3=V1 \times a \times \Delta T$ and Equation $a=5.6$.

Preparation of Toner and Developer

A toner and a developer are obtained by the same method as in Example 1 except that the kind of the specific resin particle dispersion liquid to be added for preparation of the toner particles is changed to the specific resin particle dispersion liquid 6.

Example 7

Preparation of Specific Resin Particle Dispersion Liquid 7

A specific resin particle dispersion liquid 7 is prepared by the same method as in Example 1 except that ion exchange water (aqueous medium for cooling) is started to be added dropwise 8 minutes after completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 7.

Example 8

Preparation of Specific Resin Particle Dispersion Liquid 8

A specific resin particle dispersion liquid 8 is prepared by the same method as in Example 1 except that 1500 parts of ion exchange water (aqueous medium for cooling) is added dropwise to a reaction vessel using a liquid sending pipe at an addition rate V1 of 31.2 parts/min immediately after completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 8.

Example 9

Preparation of Specific Resin Particle Dispersion Liquid 9

A specific resin particle dispersion liquid 9 is prepared by the same method as in Example 1 except that ion exchange water (aqueous medium for cooling) is added dropwise to a reaction vessel using a liquid sending pipe at an addition rate V1 of 7.8 parts/min immediately after completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 9.

Example 10

Preparation of Specific Resin Particle Dispersion Liquid 10

A specific resin particle dispersion liquid 10 is prepared by the same method as in Example 1 except that ion exchange water (aqueous medium for cooling) is started to be added at an addition rate of 19.5 parts/min immediately after completion of the addition of the total amount of the monomer-containing emulsified liquid in the second step, the internal temperature is monitored every minute, and the addition rate V1 of the ion exchange water is changed based on Equations (1): $V3=V1 \times a \times \Delta T$ and Equation $a=7.2$.

Preparation of Toner and Developer

A toner and a developer are obtained by the same method as in Example 1 except that the kind of the specific resin particle dispersion liquid to be added for preparation of the toner particles is changed to the specific resin particle dispersion liquid 10.

Example 11

Preparation of Specific Resin Particle Dispersion Liquid 11

A specific resin particle dispersion liquid 11 is prepared by the same method as in Example 1 except that ion exchange water (aqueous medium for cooling) is started to be added at an addition rate of 19.5 parts/min immediately after completion of the addition of the total amount of the monomer-containing emulsified liquid in the second step, the internal temperature is monitored every minute, and the addition rate V1 of the ion exchange water is changed based on Equations (1): $V3=V1 \times a \times \Delta T$ and Equation $a=5.4$.

Preparation of Toner and Developer

A toner and a developer are obtained by the same method as in Example 1 except that the kind of the specific resin particle dispersion liquid to be added for preparation of the toner particles is changed to the specific resin particle dispersion liquid 11.

Example 12

Preparation of Specific Resin Particle Dispersion Liquid 12

A specific resin particle dispersion liquid 12 is prepared by the same method as in Example 1 except that the temperature of ion exchange water (aqueous medium for cooling) is set to 17° C. after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 12.

Example 13

Preparation of Specific Resin Particle Dispersion Liquid 13

A specific resin particle dispersion liquid 13 is prepared by the same method as in Example 1 except that the temperature of ion exchange water (aqueous medium for cooling) is set to 33° C. after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 13.

Example 14

Preparation of Specific Resin Particle Dispersion Liquid 14

A specific resin particle dispersion liquid 14 is prepared by the same method as in Example 1 except that the temperature of ion exchange water (aqueous medium for cooling) is set to 13° C. after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 14.

Example 15

Preparation of Specific Resin Particle Dispersion Liquid 15

A specific resin particle dispersion liquid 15 is prepared by the same method as in Example 1 except that the temperature of ion exchange water (aqueous medium for cooling) is set to 37° C. after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 15.

Example 16

Preparation of Specific Resin Particle Dispersion Liquid 16

A specific resin particle dispersion liquid 16 is prepared by the same method as in Example 1 except that the temperature of ion exchange water (aqueous medium for cooling) is set to 12° C. after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 16.

Example 17

Preparation of Specific Resin Particle Dispersion Liquid 17

A specific resin particle dispersion liquid 17 is prepared by the same method as in Example 1 except that the temperature of ion exchange water (aqueous medium for cooling) is set to 44° C. after 5 minutes from completion of the addition of the total amount of the monomer-containing emulsified liquid in the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 17.

Example 18

Preparation of Specific Resin Particle Dispersion Liquid 18

A specific resin particle dispersion liquid 18 is prepared by the same method as in Example 1 except that the set temperature Tp of the aqueous mother medium is set to 62° C. in the first step and the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 18.

Example 19

Preparation of Specific Resin Particle Dispersion Liquid 19

A specific resin particle dispersion liquid 19 is prepared by the same method as in Example 1 except that the set temperature Tp of the aqueous mother medium is set to 78° C. in the first step and the second step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 19.

Example 20

Preparation of Specific Resin Particle Dispersion Liquid 20

A specific resin particle dispersion liquid 20 is prepared by the same method as in Example 1 except that n-butyl acrylate serving as a polymerizable monomer is changed to octyl acrylate in the first step.

Preparation of Toner and Developer

A toner and a developer are obtained by the same method as in Example 1 except that the kind of the specific resin particle dispersion liquid to be added for preparation of the toner particles is changed to the specific resin particle dispersion liquid 20.

Example 21

Preparation of Specific Resin Particle Dispersion Liquid 21

A specific resin particle dispersion liquid 21 is prepared by the same method as in Example 1 except that the content of the (meth)acrylic acid-based monomer is set to 22% by mass with respect to the styrene-based monomer in the first step.
Preparation of Toner and Developer A toner and a developer are obtained by the same method as in Example 1 except that the kind of the specific resin particle dispersion liquid to be added for preparation of the toner particles is changed to the specific resin particle dispersion liquid 21.

Example 22

Preparation of Specific Resin Particle Dispersion Liquid 22

A specific resin particle dispersion liquid 22 is prepared by the same method as in Example 1 except that the content of the (meth)acrylic acid-based monomer is set to 58% by mass with respect to the styrene-based monomer in the first step.
Preparation of Toner and Developer A toner and a developer are obtained by the same method as in Example 1 except that the kind of the specific resin particle dispersion liquid to be added for preparation of the toner particles is changed to the specific resin particle dispersion liquid 22.

Example 23

Preparation of Specific Resin Particle Dispersion Liquid 23

A specific resin particle dispersion liquid 23 is prepared by the same method as in Example 1 except that the monomer-containing emulsified liquid is added from the liquid sending pipe whose end on the liquid discharge side is immersed in the aqueous mother medium and the aqueous medium for cooling is added from the upper portion of the liquid surface of the aqueous mother medium using a shower in the second step.
Preparation of Toner and Developer A toner and a developer are obtained by the same method as in Example 1 except that the kind of the specific resin particle dispersion liquid to be added for preparation of the toner particles is changed to the specific resin particle dispersion liquid 23.

Example 24

Preparation of Specific Resin Particle Dispersion Liquid 24

A specific resin particle dispersion liquid 24 is prepared by the same method as in Example 1 except that a liquid sending pipe whose end on the liquid discharge side is not immersed in the aqueous mother medium is used in the second step.
Preparation of Toner and Developer A toner and a developer are obtained by the same method as in Example 1 except that the kind of the specific resin particle dispersion liquid to be added for preparation of the toner particles is changed to the specific resin particle dispersion liquid 24.

Example 25

Preparation of Specific Resin Particle Dispersion Liquid 25

A specific resin particle dispersion liquid 25 is prepared by the same method as in Example 1 except that the temperature of the aqueous mother medium is maintained in a temperature range from the set temperature to the set temperature +1.4° C. in the second step.
Preparation of Toner and Developer A toner and a developer are obtained by the same method as in Example 1 except that the kind of the specific resin particle dispersion liquid to be added for preparation of the toner particles is changed to the specific resin particle dispersion liquid 25.

Example 26

Preparation of Specific Resin Particle Dispersion Liquid 26

A specific resin particle dispersion liquid 26 is prepared by the same method as in Example 1 except that the temperature of the aqueous mother medium is maintained in a temperature range from the set temperature to the set temperature −1.4° C. in the second step.
Preparation of Toner and Developer A toner and a developer are obtained by the same method as in Example 1 except that the kind of the specific resin particle dispersion liquid to be added for preparation of the toner particles is changed to the specific resin particle dispersion liquid 26.

Example 27

Preparation of Specific Resin Particle Dispersion Liquid 27

A specific resin particle dispersion liquid 27 is prepared by the same method as in Example 1 except that the monomer-containing emulsified liquid is added without being divided in the first step.
Preparation of Toner and Developer A toner and a developer are obtained by the same method as in Example 1 except that the kind of the specific resin particle dispersion liquid to be added for preparation of the toner particles is changed to the specific resin particle dispersion liquid 27.

Comparative Example 1

Preparation of Specific Resin Particle Dispersion Liquid C1

A specific resin particle dispersion liquid C1 is prepared by the same method as in Example 1 except that the solution in the reaction vessel is heated at 65° C. for 180 minutes to complete the reaction and cooled immediately after completion of the addition of the total amount of the monomer-containing emulsified liquid in the second step.
Preparation of Toner and Developer A toner and a developer are obtained by the same method as in Example 1 except that the kind of the specific resin particle dispersion liquid to be added for preparation of the toner particles is changed to the specific resin particle dispersion liquid C1.
Evaluation of Color Point A developing device of an electrophotographic copier (Docu Centre Color450, manufactured by Fuji Xerox Co., Ltd.) from which a fixing device is taken out is filled with the obtained developer, and an unfixed image is output. The electrophotographic copier accommodating the developer is allowed to stand in a high-temperature and high-humidity environment (temperature of 30° C./relative humidity of 85%) for one day, and 1000 images with an image density of 90% and a size of 40 mm×40 mm are continuously printed on one surface of OKT127 paper in an environment of a temperature of 30° C. and a relative humidity of 85%. In the printed images, the 901st image to the 1000th image are visually observed, the presence or absence of color points is confirmed, and the color points are evaluated according to the following evaluation standards. The allowable range is up to G3.

G1: Color points are generated
G2: Color points are generated in 1 or more and 3 or less images
G3: Color points are generated in 4 or more and 5 or less images
G4: Color points are generated in 6 or more images Evaluation of Low-Temperature Fixability A developing device of an electrophotographic copier (Docu Center Color450, manufactured by Fuji Xerox Co., Ltd.) from which a fixing device is taken out is filled with the obtained electrostatic charge image developer, and an unfixed image is output. Unfixed images with an image density of 90% and a size of 40 mm×40 mm are formed on one surface of OKT127 paper used as the recording medium.

Thereafter, the unfixed images are fixed by a fixing evaluation device, and the low-temperature fixability is evaluated. As the fixing evaluation device, a fixing device of DocuPrint P450 (manufactured by Fuji Xerox Co., Ltd.) is taken out and modified such that the fixing temperature can be changed is used.

The fixing temperature is increased from 110° C. to 160° C. at an interval of 5° C., and the temperature at which offset (a phenomenon in which the image is transferred to the fixing member caused by insufficient melting of the toner image) does not occur (minimum fixing temperature) is classified as follows. The allowable range is up to G2.

G1: The minimum fixing temperature is 130° C. or lower
G2: The minimum fixing temperature is higher than 130° C. and 140° C. or less
G3: The minimum fixing temperature is higher than 140° C. and 150° C. or lower
G4: The minimum fixing temperature is higher than 150° C.

Evaluation of Coarse Powder

The amount of coarse powder contained in the specific resin particles is evaluated by measuring the amount of coarse powder on a 200 mesh net.

The procedure for measuring the amount of coarse powder on the 200 mesh net is as described above.

The amount of coarse powder is evaluated according to the following evaluation standards based on the obtained measured values. Further, G1 indicates that the content of the coarse powder is the smallest, and G4 indicates that the amount of the coarse powder is the largest. Here, Table 1 shows the evaluation results based on the following evaluation standards together with the amount of coarse powder on the 200 mesh net.

G1: The measured value of the amount of coarse powder on the 200 mesh net is 0.3% or less
G2: The measured value of the amount of coarse powder on the 200 mesh net is greater than 0.3% and 0.5 or less
G3: The measured value of the amount of coarse powder on the 200 mesh net is greater than 0.5% and 1.0% or less
G4: The measured value of the amount of coarse powder on the 200 mesh net is greater than 1.0%

TABLE 1-1

| | | First step | | | | | | Second step | | | |
|---|---|---|---|---|---|---|---|---|---|---|---|
| | | Aqueous mother | Polymerizable monomer | First monomer-containing emulsified | Second monomer-containing emulsified liquid | | | Aqueous medium for cooling | | | |
| Type of specific resin particle dispersion | | medium Temperature (° C.) | Type | Ac/St × 100 (% by mass) | liquid Addition amount (parts) | Addition amount (parts) | Addition rate V2 (parts/min) | Specific heat C2 | Whether to add | Addition start time (min) | Temperature (° C.) | Addition rate V1 (parts/min) |
| Example1 | 1 | 65 | St/Ac | 50 | 60 | 5330 | 30 | 2590 | Added | 0 | 25 | 19.5 |
| Example2 | 2 | 65 | St/Ac | 50 | 60 | 5330 | 30 | 2590 | Added | 5 | 25 | 19.5 |
| Example3 | 3 | 65 | St/Ac | 50 | 60 | 5330 | 30 | 2590 | Added | 0 | 25 | 29.3 |
| Example4 | 4 | 65 | St/Ac | 50 | 60 | 5330 | 30 | 2590 | Added | 0 | 25 | 9.8 |
| Example5 | 5 | 65 | St/Ac | 50 | 60 | 5330 | 30 | 2590 | Added | 0 | 25 | 19.5 |
| Example6 | 6 | 65 | St/Ac | 50 | 60 | 5330 | 30 | 2590 | Added | 0 | 25 | 19.5 |
| Example7 | 7 | 65 | St/Ac | 50 | 60 | 5330 | 30 | 2590 | Added | 8 | 25 | 19.5 |
| Example8 | 8 | 65 | St/Ac | 50 | 60 | 5330 | 30 | 2590 | Added | 0 | 25 | 31.2 |
| Example9 | 9 | 65 | St/Ac | 50 | 60 | 5330 | 30 | 2590 | Added | 0 | 25 | 7.8 |
| Example10 | 10 | 65 | St/Ac | 50 | 60 | 5330 | 30 | 2590 | Added | 0 | 25 | 19.5 |
| Example11 | 11 | 65 | St/Ac | 50 | 60 | 5330 | 30 | 2590 | Added | 0 | 25 | 19.5 |
| Comparative example1 | C1 | 65 | St/Ac | 50 | 60 | 5330 | 30 | 2590 | Not added | | 25 | — |
| Example12 | 12 | 65 | St/Ac | 50 | 60 | 5330 | 30 | 2590 | Added | 0 | 17 | 19.5 |
| Example13 | 13 | 65 | St/Ac | 50 | 60 | 5330 | 30 | 2590 | Added | 0 | 33 | 19.5 |
| Example14 | 14 | 65 | St/Ac | 50 | 60 | 5330 | 30 | 2590 | Added | 0 | 13 | 19.5 |
| Example15 | 15 | 65 | St/Ac | 50 | 60 | 5330 | 30 | 2590 | Added | 0 | 37 | 19.5 |
| Example16 | 16 | 65 | St/Ac | 50 | 60 | 5330 | 30 | 2590 | Added | 0 | 12 | 19.5 |
| Example17 | 17 | 65 | St/Ac | 50 | 60 | 5330 | 30 | 2590 | Added | 0 | 44 | 19.5 |
| Example18 | 18 | 62 | St/Ac | 50 | 60 | 5330 | 30 | 2590 | Added | 0 | 25 | 19.5 |
| Example19 | 19 | 78 | St/Ac | 50 | 60 | 5330 | 30 | 2590 | Added | 0 | 25 | 19.5 |
| Example20 | 19 | 65 | St/Ac | 50 | 60 | 5330 | 30 | 2590 | Added | 0 | 25 | 19.5 |
| Example21 | 19 | 65 | St/Ac | 22 | 60 | 5330 | 30 | 2590 | Added | 0 | 25 | 19.5 |
| Example22 | 19 | 65 | St/Ac | 58 | 60 | 5330 | 30 | 2590 | Added | 0 | 25 | 19.5 |

TABLE 1-1-continued

| | | | | | | | | | | | | |
|---|---|---|---|---|---|---|---|---|---|---|---|---|
| Example23 | 19 | 65 | St/Ac | 50 | 60 | 5330 | 30 | 2590 | Added | 0 | 25 | 19.5 |
| Example24 | 19 | 65 | St/Ac | 50 | 60 | 5330 | 30 | 2590 | Added | 0 | 25 | 19.5 |
| Example25 | 19 | 65 | St/Ac | 50 | 60 | 5330 | 30 | 2590 | Added | 0 | 25 | 19.5 |
| Example26 | 19 | 65 | St/Ac | 50 | 60 | 5330 | 30 | 2590 | Added | 0 | 25 | 19.5 |
| Example27 | 19 | 65 | St/Ac | 50 | 0 | 5390 | 30 | 2590 | Added | 0 | 25 | 19.5 |

| | Second step | | | | | | Evaluation | | | | |
|---|---|---|---|---|---|---|---|---|---|---|---|
| | Aqueous medium for cooling | | | Value of a in Expression (2) | Temperature holding range (° C.) | Liquid sending pipe | | Evaluation of color point | Evaluation of low-temperature fixability | Evaluation of coarse powder |
| | Specific heat C1 | Addition amount V3 (parts) | V1c1/V2c2 | Tm(O) (° C.) | | | Identical/different | Immersion of end | | | |
| Example1 | 4180 | 19.5 | 1 | 65 | 6.25 | 0 | Identical | Immersed | G1 | G1 | 0.2%/G1 |
| Example2 | 4180 | 19.5 | 1 | 65 | 6.25 | 0 | Identical | Immersed | G2 | G2 | 0.4%/G2 |
| Example3 | 4180 | 29.3 | 1.5 | 65 | 6.25 | 0 | Identical | Immersed | G2 | G2 | 0.4%/G2 |
| Example4 | 4180 | 9.8 | 0.5 | 65 | 6.25 | 0 | Identical | Immersed | G2 | G2 | 0.4%/G2 |
| Example5 | 4180 | 27.3 | 1 | 65 | 7 | 0.2 | Identical | Immersed | G2 | G2 | 0.4%/G2 |
| Example6 | 4180 | 21.8 | 1 | 65 | 5.6 | 0.2 | Identical | Immersed | G2 | G2 | 0.4%/G2 |
| Example7 | 4180 | 19.5 | 1 | 65 | 6.25 | 0 | Identical | Immersed | G3 | G3 | 0.6%/G3 |
| Example8 | 4180 | 31.2 | 1.6 | 65 | 6.25 | 0 | Identical | Immersed | G3 | G3 | 0.6%/G3 |
| Example9 | 4180 | 7.8 | 0.4 | 65 | 6.25 | 0 | Identical | Immersed | G3 | G3 | 0.6%/G3 |
| Example10 | 4180 | 28.1 | 1 | 65 | 7.2 | 0.2 | Identical | Immersed | G3 | G3 | 0.6%/G3 |
| Example11 | 4180 | 21 | 1 | 65 | 5.4 | 0.2 | Identical | Immersed | G3 | G3 | 0.6%/G3 |
| Comparative example1 | 4180 | — | — | 65 | — | — | — | Immersed | G4 | G4 | 1.1%/G4 |
| Example12 | 4180 | 19.5 | 1 | 65 | 6.25 | 0 | Identical | Immersed | G2 | G2 | 0.4%/G2 |
| Example13 | 4180 | 19.5 | 1 | 65 | 6.25 | 0 | Identical | Immersed | G2 | G2 | 0.4%/G2 |
| Example14 | 4180 | 19.5 | 1 | 65 | 6.25 | 0 | Identical | Immersed | G3 | G2 | 0.6%/G3 |
| Example15 | 4180 | 19.5 | 1 | 65 | 6.25 | 0 | Identical | Immersed | G3 | G2 | 0.6%/G3 |
| Example16 | 4180 | 19.5 | 1 | 65 | 6.25 | 0 | Identical | Immersed | G3 | G2 | 0.6%/G3 |
| Example17 | 4180 | 19.5 | 1 | 65 | 6.25 | 0 | Identical | Immersed | G3 | G2 | 0.6%/G3 |
| Example18 | 4180 | 19.5 | 1 | 65 | 6.25 | 0 | Identical | Immersed | G2 | G3 | 0.6%/G3 |
| Example19 | 4180 | 19.5 | 1 | 65 | 6.25 | 0 | Identical | Immersed | G2 | G3 | 0.6%/G3 |
| Example20 | 4180 | 19.5 | 1 | 65 | 6.25 | 0 | Identical | Immersed | G2 | G1 | 0.4%/G2 |
| Example21 | 4180 | 19.5 | 1 | 65 | 6.25 | 0 | Identical | Immersed | G2 | G1 | 0.4%/G2 |
| Example22 | 4180 | 19.5 | 1 | 65 | 6.25 | 0 | Identical | Immersed | G2 | G3 | 0.4%/G2 |
| Example23 | 4180 | 19.5 | 1 | 65 | 6.25 | 0 | Different | Immersed | G3 | G3 | 0.6%/G3 |
| Example24 | 4180 | 195 | 1 | 65 | 6.25 | 0 | Different | Not immersed | G3 | G3 | 0.6%/G3 |
| Example25 | 4180 | 19.5 | 1 | 65 | 6.25 | 1.4 | Identical | Immersed | G3 | G3 | 0.6%/G3 |
| Example26 | 4180 | 19.5 | 1 | 65 | 6.25 | −1.4 | Identical | Immersed | G3 | G3 | 0.6%/G3 |
| Example27 | 4180 | 19.5 | 1 | 65 | 6.25 | 0 | Identical | Immersed | G3 | G3 | 0.6%/G3 |

The description in the tables will be described below.

"St/Ac" of the polymerizable monomer species indicates that the polymerizable monomers are a styrene-based monomer and a (meth)acrylic acid-based monomer.

"Ac/St×100" indicates the content of the (meth)acrylic acid-based monomer with respect to the styrene-based monomer.

The "temperature holding range" indicates the range of deviation of the temperature of the aqueous mother medium from the set temperature after the addition of the monomer-containing emulsified liquid. For example, the description of "1.5° C." indicates that the temperature of the aqueous mother medium after the addition of the monomer-containing emulsified liquid is deviated from the set temperature within a range of the set temperature or higher and lower than or equal to a temperature higher than the set temperature by 1.5° C. Further, "–" used in Comparative Example 1 indicates that the deviation of the temperature of the aqueous mother medium from the set temperature is large (out of the range of the set temperature ±1.5° C.), and the range of the deviation from the set temperature can not be shown accurately.

Further, "liquid sending pipe same/different" indicates whether the liquid sending pipes used to add the monomer-containing emulsified liquid and the aqueous medium for cooling to the aqueous mother medium are the same as or different from each other.

As shown in the above-described results, it is found that the resin particles of the present example suppress the generation of coarse powder.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of producing resin particles comprising:
a first step of adding a monomer-containing emulsified liquid that contains a polymerizable monomer and an aqueous medium to an aqueous mother medium to polymerize the polymerizable monomer, a second step of adding an aqueous medium for cooling to the aqueous mother medium after completion of the addition of the monomer-containing emulsified liquid to the aqueous mother medium, and a third step of heating the aqueous mother medium after a completion of the adding of the aqueous medium for cooling in the second step.

2. The method of producing resin particles according to claim 1,
wherein in the second step, the aqueous medium for cooling is added to the aqueous mother medium within 5 minutes after completion of the addition of the monomer-containing emulsified liquid to the aqueous mother medium.

3. The method of producing resin particles according to claim 1,
wherein in the first step, a first monomer-containing emulsified liquid containing a first polymerizable monomer as the polymerizable monomer is added to the aqueous mother medium to polymerize the first polymerizable monomer so that seed resin particles are generated, and
a second monomer-containing emulsified liquid containing a second polymerizable monomer as the polymerizable monomer is added to the seed resin particles to polymerize the second polymerizable monomer.

4. The method of producing resin particles according to claim 3,
wherein in the second step, in a case where an addition rate of the aqueous medium for cooling is defined as V1, a specific heat of the aqueous medium for cooling is defined as C1, an addition rate of the second monomer-containing emulsified liquid is defined as V2, and a specific heat of the second monomer-containing emulsified liquid is defined as C2, an expression of "$0.5 \leq V1C1/V2C2 \leq 1.5$" is satisfied, and units of the addition rates V1 and V2, and the specific heats C1 and C2 are parts/min, and J/(kg·K), respectively.

5. The method of producing resin particles according to claim 4,
wherein in the second step, in a case where an absolute value (|Tp−Tm|) of a difference between a set temperature Tp of the aqueous mother medium and a measured temperature Tm of the aqueous mother medium after completion of the addition of the monomer-containing emulsified liquid is defined as ΔT, the ΔT, the V1, and an addition amount V3 of the aqueous medium for cooling in a case of a change in temperature of the aqueous mother medium by ΔT satisfy Expression (1) and Equation (2), $5.6 \leq a \leq 7.0$, and $V3 = V1 \times a \times \Delta T$  Equation (2).

6. The method of producing resin particles according to claim 1,
wherein in a case where a measured temperature of the aqueous mother medium at a time point of completion of the addition of the monomer-containing emulsified liquid is defined as Tm (0), a temperature of the aqueous medium for cooling is Tm (0)−50° C. or higher and Tm (0)−30° C. or lower.

7. The method of producing resin particles according to claim 6,
wherein the temperature of the aqueous medium for cooling is 10° C. or higher and 45° C. or lower.

8. The method of producing resin particles according to claim 6,
wherein a temperature of the aqueous mother medium is 60° C. or higher and 80° C. or lower.

9. The method of producing resin particles according to claim 1,
wherein the polymerizable monomer is a styrene-based monomer and a (meth)acrylic acid-based monomer.

10. The method of producing resin particles according to claim 9,
wherein a content of the (meth)acrylic acid-based monomer is 20% by mass or greater and 60% by mass or less with respect to the styrene-based monomer.

11. The method of producing resin particles according to claim 1,
wherein the monomer-containing emulsified liquid and the aqueous medium for cooling are added to the aqueous mother medium from an identical liquid sending pipe.

12. The method of producing resin particles according to claim 11,
wherein an end of the liquid sending pipe on a liquid discharge side is immersed in the aqueous mother medium.

13. A method of producing resin particles comprising:
adding a monomer-containing emulsified liquid that contains a polymerizable monomer and an aqueous medium to an aqueous mother medium to polymerize the polymerizable monomer,
wherein the polymerizable monomer is a styrene-based monomer and a (meth)acrylic acid-based monomer,
a content of the (meth)acrylic acid-based monomer is 20% by mass or greater and 60% by mass or less with respect to the styrene-based monomer, and
a temperature of the aqueous mother medium after the addition of the monomer-containing emulsified liquid is maintained within ±1.5° C. of a set temperature, wherein the temperature of the aqueous mother medium is maintained by adding an aqueous medium for cooling to the aqueous mother medium within 5 minutes after a completion of the adding of the monomer-containing emulsified liquid to the aqueous mother medium.

14. A method of producing an electrostatic charge image developing toner, comprising:
aggregating at least resin particles obtained by the method of producing resin particles according to claim 1 in a dispersion liquid containing the resin particles to form aggregated particles; and
heating an aggregated particle dispersion liquid in which the aggregated particles are dispersed and fusing and coalescing the aggregated particles to form toner particles.

* * * * *